United States Patent
Skinner et al.

[11] 3,758,066
[45] Sept. 11, 1973

[54] APPARATUS FOR FABRICATING A PIPE JOINT SEALING DEVICE

[75] Inventors: Harry W. Skinner; Fouad M. Deeb, both of Fort Wayne, Ind.

[73] Assignee: Harry W. Skinner, Fort Wayne, Ind.

[22] Filed: Nov. 11, 1971

[21] Appl. No.: 197,729

[52] U.S. Cl. .................... 249/95, 249/83, 249/184
[51] Int. Cl. .............................................. B28b 7/30
[58] Field of Search .................. 249/83, 84, 89, 39, 249/95, 151, 184; 264/275, 278

[56] References Cited
UNITED STATES PATENTS

| | | | |
|---|---|---|---|
| 1,090,211 | 3/1914 | Hiatt | 249/95 |
| 2,955,322 | 10/1960 | Hite | 249/83 |
| 2,935,349 | 5/1960 | Burch | 288/7 |
| 3,137,039 | 6/1964 | St. John | 264/275 X |
| 3,363,876 | 1/1968 | Moore | 249/184 X |
| 3,346,230 | 10/1967 | Tolf, Jr. | 249/177 |
| 3,154,816 | 11/1964 | Harrison et al. | 249/89 X |
| 3,727,876 | 4/1973 | Keyser | 249/184 |

*Primary Examiner*—J. Spencer Overholser
*Assistant Examiner*—B. D. Tobor
*Attorney*—Harold B. Hood et al.

[57] ABSTRACT

This disclosure relates to an apparatus for fabricating a pipe joint sealing device, this device including a concrete structure, such as a manhole, having an opening in the wall thereof provided with a rubber lining or gasket. It is the purpose of this invention to provide the concrete structure with the sealing ring or gasket permanently locked therein in fluid-tight engagement. The apparatus includes an annular support preferably fabricated of glass fiber reinforced plastic, this support resembling the wheel and rim of an ordinary automobile wheel which is adapted to mount the usual rubber tire. This support is radially divided into two annular or disc-like sections, one of the sections having an annular support or boss adapted to receive thereover in coaxial relation a rubber-sealing ring. The two support sections are detachably secured together so as to retain the sealing ring in position, and the support is further designed with radially outwardly extending sides which define a generally U-shaped cross-section or channel. This channel shape is of such size that the sealing ring seats on the base thereof with the sides extending angularly outwardly therefrom.

In the use of this apparatus, the support or form with the sealing ring thereon is supported in position in a concrete mold set up for casting a concrete structure, such as a manhole. Liquid concrete is introduced into the mold in the usual manner in encircling relation to the form and rubber ring and caused to harden. The form sections are eventually removed leaving the sealing ring securely cast and locked into the perimeter of the opening formed by both the sealing ring and the support form.

6 Claims, 11 Drawing Figures

PATENTED SEP 11 1973 3,758,066

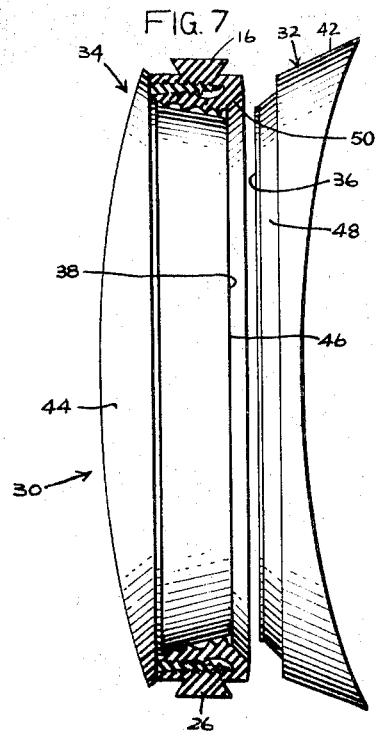
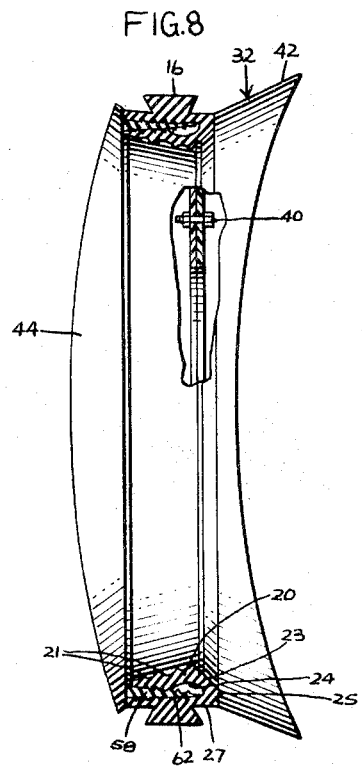

APPARATUS FOR FABRICATING A PIPE JOINT SEALING DEVICE

BACKGROUND OF THE INVENTION

1. Field of the Invention

This invention relates to an apparatus for use in fabricating pipe joint sealing devices, and more particularly to an apparatus adapted to support a rubber-sealing ring or gasket in position while a concrete structure is cast thereabout, the apparatus serving to define an opening in the concrete structure and to support the rubber-sealing ring in position while the concrete is formed thereabout in securing relation.

2. DESCRIPTION OF THE PRIOR ART

Typically, concrete pipe, concrete manholes, septic tanks and the like, are formed with holes adapted to receive sections of pipe. An annular clearance is provided between the pipe and the opening which must be sealed, and in the usual instance, this annular clearance is stuffed with a suitable sealing material, such as a rubber O-ring or mortar or the like. Typical seals are disclosed in U.S. Pat. Nos. 2,924,427; 2,935,349; and 3,348,850. Such annular seals are secured in place either by frictional contact with the walls defining the clearance or in the alternative by auxiliary clamping devices assembled to the pipe or to the concrete structure. Such sealing arrangements suffer from the disadvantage of being difficult and time consuming to install as well as being subject to leakage or blowout.

SUMMARY OF THE INVENTION

In accordance with the broader aspects of this invention, there is provided an apparatus for forming a pipe joint sealing device which serves the dual purpose of supporting a rubber-sealing ring in position while concrete is cast thereabout and also for defining the opening into which the sealing ring is installed. This mold device includes a plug structure having an outer surface that generally defines an annular support adapted to receive a rubber-sealing ring thereon. This plug structure includes a rim portion which in cross-section is generally channel shaped, the aforementioned annular support being defined by the base of the channel and the sides thereof which generally are shaped to extend axially oppositely at an angle therefrom. The plug structure is formed of at least two annular or disc-like sections which may be disassembled from the cast structure upon the hardening thereof.

It is therefore an object of this invention to provide an apparatus for use in fabricating a pipe joint-sealing device which is simple in construction, facile to use, and economical.

It is another object of this invention to provide a combination gasket-supporting and concrete-molding device so arranged that upon positioning the same in a concrete mold, a concrete structure may be cast with the hole being formed by the device and a sealing ring or gasket permanently interlocked into the perimeter of the opening.

It is still another object of this invention to provide an apparatus for forming the opening in a concrete structure and mounting a rubber-sealing ring in relation thereto, the device being disassemblable such that once the concrete hardens it may be simply and quickly removed therefrom. Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 7 is a side view in exploded form and partially sectioned of the plug of FIG. 2 but with the rubber-sealing ring of FIG. 5 mounted thereon, the plug being shown disassembled;

FIG. 8 is a view like FIG. 7 but with the sections of the plug secured together;

DESCRIPTION OF THE PREFERRED EMBODIMENT

Figure 1:
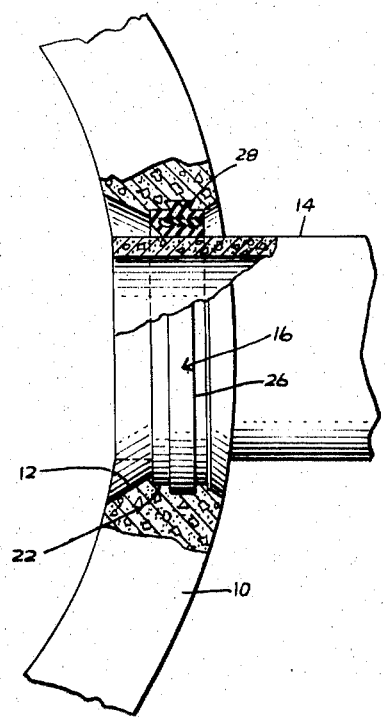
FIG. 1 is a fragmentary view, partially sectioned for clarity of illustration, of one embodiment of this invention wherein a section of entry pipe is joined to a manhole.
Figure 2:
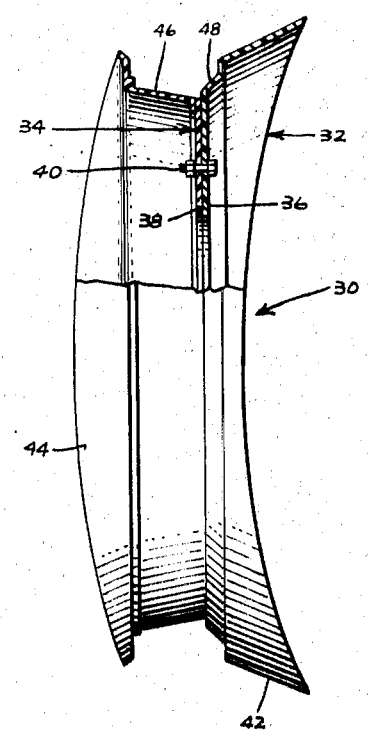
FIG. 2 is a side view, partly sectioned for clarity of illustration, of a ring-mounting plug used in fabricating the sealing joint of this invention.

Referring to the drawings, and more particularly to FIG. 1, a conventional manhole 10 of cylinder shape and formed of concrete is provided with a circular opening 12 of the cross-sectional shape shown into which a section 14 of pipe is installed. A sealing ring of rubber or rubber-like material 16 is fitted into the annular space between the perimter of the opening 12 and the pipe section 14, this ring 16 providing a fluid-tight seal that typically prevents leakage of water from the manhold 10 past the exterior pipe section 14.

The ring 16, preferably made of rubber, may be formed of other materials such as vinyl plastic or the like which exhibit pliable, resilient characteristics much like rubber. In a working embodiment of this invention, the ring 16 is provided with a shape shown more clearly in FIG. 5. The ring is essentially V-shaped in cross-section thereby defining radially inner and outer annular portions or flanges 20 and 22 (the drawings being substantially to scale) which are serrated on the inner surfaces and provided with an annular cavity 24 in the portion 20. On the flange 22 is provided a radially outwardly projecting anchoring annulus 26 of keystone cross-section, the outer surface of flange 22 being substantially cylindrical and extending equal distances from the opposite sides of the anchor 26.

Figure 5:
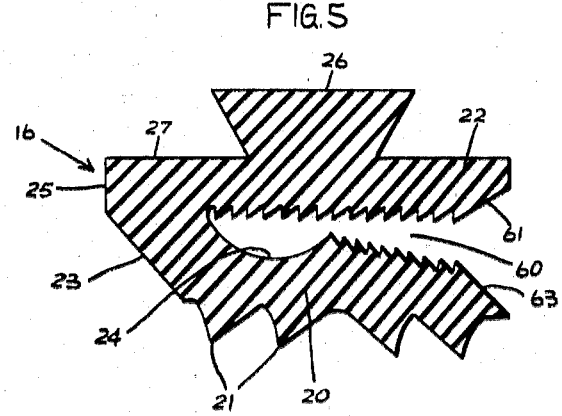
FIG. 5 is a cross-sectional illustration of one embodiment of the rubber-sealing ring of this invention.

The inner surface of the flange 20 is provided with four radially inwardly projecting ribs 21 which, in cross-section, are generally of triangular shape as is shown more clearly in FIG. 5. The four ribs are contained in two pairs or groups, the ribs of each pair being inclined oppositely from those of the other pair as shown. One end of the flange 20 is provided with an annular surface 23 at an angle of about 45° to the axis of the ring 16. This surface 23 merges into yet another surface 25 at right angles to the axis.

Figure 6:
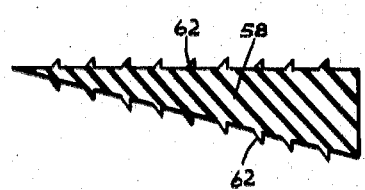
FIG. 6 is a cross-section of a rubber wedge used in conjunction with the sealing ring of FIG. 5.
Figure 3:
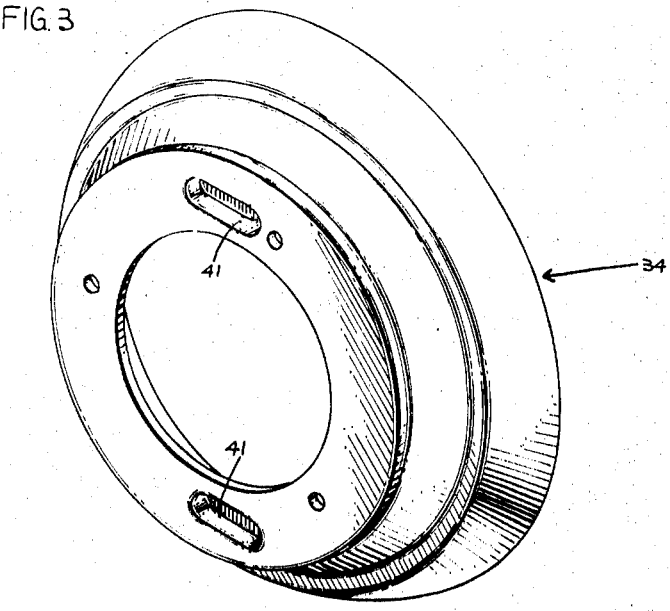
FIGS. 3 and 4 are plan views of the two different sections making up the plug of FIG. 2.
Figure 4:
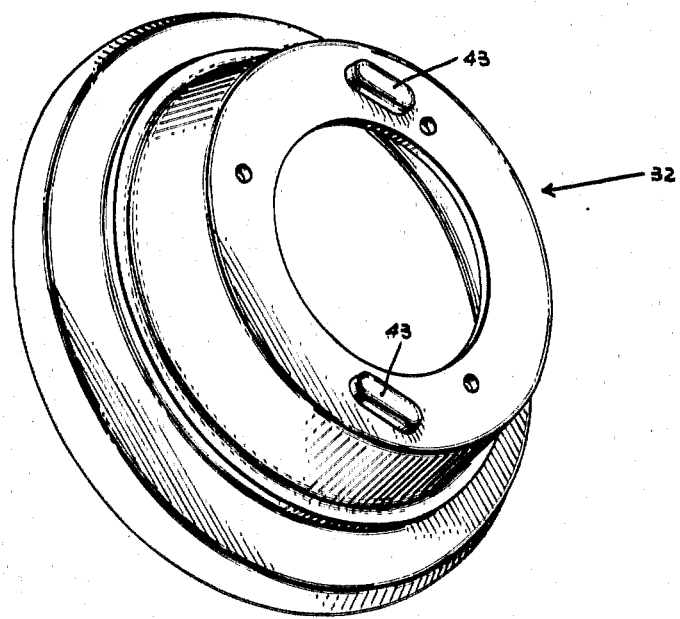

The space 60 between the two flanges 20 and 22 is further defined by the two beveled edges 61 and 63 which serves in providing a wider entrance way into the space 60 for the strip of wedge 58 for FIG. 6.

Referring to FIG. 1, it will be noted that the anchor 26 intimately fits into an annular socket 28 of complementary size and shape which serves to lock the anchor to the perimeter of the opening 12. The concrete forming the opening 12 also intimately engages the cylindrical surface of the flange 22 such that the ring 16 is positively interlocked with the concrete and thereby prevented from dislodgement either radially or axially from the opening 12.

The actual installation of a section of pipe 14 into the fabricated opening just defined will be explained later on. In the following will be described the apparatus and method for fabricating the rubber-lined opening in the manhole.

The manhole 10 is cast or molded of concrete according to conventional methods. However, a unique structure is utilized for the purpose of not only forming the opening 12 but also the proper positioning of the sealing ring 16 during casting of the manhole.

This unique structure which is characterized in the following as ring-mounting plug 30, is shown in detail in FIGS. 2, 3, 4, 7 and 8. This plug 30 is formed of glass fiber reinforced plastic of the type usually employed in the fabrication of boats and the like, and in the preferred embodiment is in two sections 32 and 34, respectively. The plug 30 is generally circular in shape resembling the wheel and rim of an automobile, each section 32 and 34 being provided with annular discs 36 and 38, respectively, extending radially inwardly and in planar abutting engagement with each other. A plurality of removable fastening devices, such as nut and screw assemblies 40, are used for securing the two sections 32 and 34 together. Mating projections 41 and indentations 43 in the discs serve in locating the sections rotationally relative to each other. The outer peripheral portion of the assembled plug 30 is channel shaped as more clearly shown in FIG. 2 with the opposite sides 42 and 44 thereof flaring outwardly and generally being of frusto-conical shape. The perimeters of these sides 42 and 44, as viewed in FIG. 2, have a curvature as shown which conforms to the cylindrical shape of the finished manhole of FIG. 1. The purpose of this curvature will be explained in more detail later.

Considering for the moment only the plug section 34, it will be noted that it is provided with a frusto-conically shaped portion 46 which is integrally connected to the outer perimeter of the disc 34.

As regards the section 32, it is also provided with a frusto-conically shaped portion 48, larger in diameter yet of lesser axial depth than the conical portion 46.

Utilization of the ring-mounting plug 30 will now be explained. With the two sections 32 and 34 disassembled as shown in FIG. 7, the sealing ring 16 is telescoped over the frusto-conical portion 46. As stated previously, the relative shapes and dimensions are shown to scale. The keystone annulus 26 is outermost.

The section 32 is next assembled to the section 34 and the two are fastened together by means of the nut and screw assemblies 40 or any similar quick-lock fastening devices conventionally available. The frusto-conical portion 48 on the section 32 is abutted against the similarly shaped portion 50 on the sealing ring 16 thereby mounting securely the sealing ring 16 on the plug 30. This assembly is now ready to be used in connection with the casting of the manhole which will be explained in connection with FIG. 9.

Figure 9:
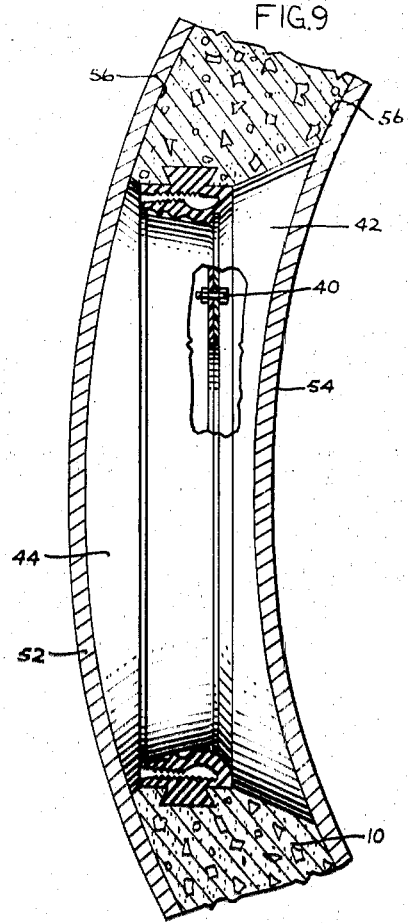
FIG. 9 is a fragmentary sectional view illustrating certain of the steps involved in fabricating the joint of this invention.

Cylindrical coaxial mold forms 52 and 54 of fiberglass, metal or the like, are spaced to provide for the shape and size of a manhole to be formed by filling the space 56 therebetween with concrete. However, prior to pouring concrete into the mold, the plug assembly of FIG. 8 is placed in the proper position in the cavity 56 (FIG. 9). As explained earlier, the perimeters of the flanges or sides 42 and 44 (FIG. 2) are formed generally to conform to the shape of the finished manhole, and as will now be apparent in FIG. 9, this shape conforms precisely to the opposite cylindrical surfaces of the cavity 56. Thus, the flanges 42 and 44 seal against the inner sides of the forms 52 and 54 to prevent the escape of concrete which may be poured into the cavity 56. The shapes of the perimeters of the flanges 42 and 44 in engagement with the forms 52 and 54 provide a circular opening in the manhole wall in the region to which the sealing ring 16 is anchored.

Figure 10:
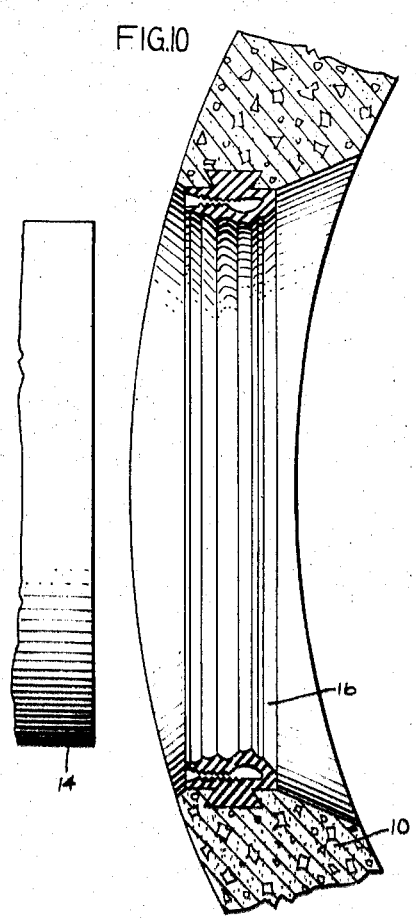
FIG. 10 is a view similar to FIG. 9 showing the rubber-sealing ring locked in place in the opening of a concrete manhole.

Liquid concrete is poured into the cavity 56 to form the manhole. This concrete fills the space around the plug 30 and the sealing ring 16. Upon hardening, the forms 52 and 54 are removed thereby leaving the structure shown in FIG. 10, the sealing ring 16 being firmly anchored into the concrete mass.

The plug 30 is disassembled by removing the fastening devices 40 permitting the two sections 32 and 34 to be withdrawn from the hardened concrete. These forms 32 and 34 may then be reused to form other rubber-lined hole structures.

A section of pipe 14 is installed in the manhole as follows. The entry end of the pipe section 14 is merely inserted into the opening defined by the ring 16. Properly sized, the ring 16 will lightly engage the surface of the pipe 14.

Figure 11:
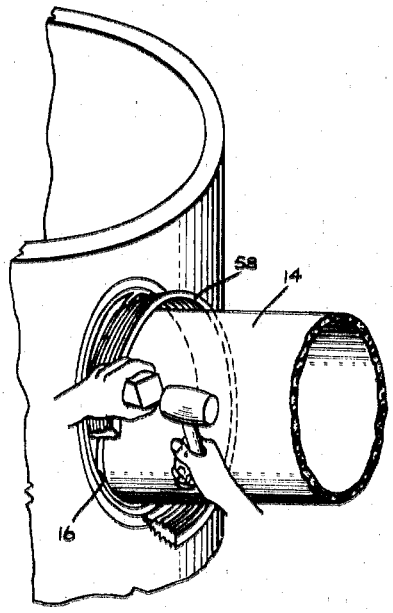
FIG. 11 is a perspective illustration showing the final step of completing the seal between a section of pipe entered into the fabricated, lined opening in the manhole.

As shown more clearly in FIG. 11, a length of wedge material 58, as shown in cross-section in FIG. 6, is inserted into the V-shaped space 60 in the ring 16 and there driven into place by means of a hammer or mallet. The wedge 58 serves to spread the lips or flanges 20 and 22 of the sealing ring 16 thereby forcing the flange 20 into intimate, sealing contact with the periphery of the pipe section 14.

In one working embodiment of this invention, if the sealing ring 16 and the wedge 58 are formed of rubber, it is preferred that the ring 16 be 40 durometer and the wedge 58 60 durometer. The wedge 58 is provided with longitudinally extending teeth 62 as shown, these engaging the annular serrations in the inner surfaces of the two flanges 20 and 22 (FIG. 5) to prevent withdrawal of the wedge 58. Once the wedge 58 has been driven into place, around the entire circumference of the sealing ring 16, the operation of forming the pipe joint is completed. In actual practice, the installation of such a joint requires no more than from three to four minutes by a single individual.

While the material for the plug 30 (sections 32, 34) has been specified as glass fiber reinforced plastic, other materials may be used such as steel, aluminum and the like. As regards the manhole 10 of cylindrical shape, which is the structure receiving the rubber seal 16, rectangular septic tanks, electrical utility boxes and the like may also be used, in which event, because of the different wall shapes, the shapes of the perimeters of the sections 32, 34 are correspondingly changed.

While there have been described above the principles of this invention in connection with specific apparatus, it is to be clearly understood that this description is made only by way of example and not as a limitation to the scope of the invention.

What is claimed is:

1. A concrete mold device for forming an opening in a rigid concrete structure and for holding a rubber-sealing ring in position while concrete is cast about the mold, comprising a plug structure including two disc-like sections detachably secured together and having an outer annular support surface adapted axially slidably to receive a rubber-sealing ring thereon, said plug structure further including a rim portion having sides that extend radially outwardly and axially oppositely from said annular support surface, said rim portion sides and said support surface defining a pair of axially spaced-apart shoulders, said rim portion having a radially outwardly exposed surface that serves as a mold for defining the opening in said rigid concrete structure, a rubber ring mounted on said annular supporting surface in abutting engagement with said shoulders.

2. The mold device of claim 1 in which said rim surface in cross-section is channel-shaped said sides thereof angling outwardly, the base of the channel shape serving as said sealing ring support.

3. The device of claim 2 in which one of said rim sides is on one of said sections and the other of said sides is on the other of said sections, one section having a frusto-conically shaped annular portion thereon which constitutes a portion of said sealing ring support, the other section being axially separable from said first section to thereby expose said frusto-conical portion for assembly or removal of a sealing ring.

4. The device of claim 3 in which said two sections have abutted radial flanges detachably secured together, the smaller diameter portion of the sealing-ring support being on said first section, and said rim sides being generally frusto-conically shaped.

5. The device of claim 4 in which said rim sides have perimetral shapes that conform to the intersection of a cylinder therewith having an axis that intersects the axis of said annular support at right angles.

6. The mold device of claim 2 in which said rim sides have perimetral shapes that conform to the intersection of a cylinder therewith having an axis that intersects the axis of said annular support at right angles.

* * * * *